(No Model.)  2 Sheets—Sheet 1.

W. J. MAGEE.
VETERINARY OPERATING TABLE.

No. 500,588. Patented July 4, 1893.

WITNESSES:
Frank S. Ober
James P. Foster

INVENTOR
William J. Magee (No Model.) 2 Sheets—Sheet 2.

W. J. MAGEE.
VETERINARY OPERATING TABLE.

No. 500,588. Patented July 4, 1893.

WITNESSES:
Frank S. Ober
James P. Foster

INVENTOR
William J. Magee

UNITED STATES PATENT OFFICE.

WILLIAM J. MAGEE, OF NEW YORK, N. Y.

VETERINARY OPERATING-TABLE.

SPECIFICATION forming part of Letters Patent No. 500,588, dated July 4, 1893.

Application filed February 17, 1893. Serial No. 462,801. (No model.)

*To all whom it may concern:*

Be it known that I, WILLIAM J. MAGEE, a citizen of the United States, and a resident of the city, county, and State of New York, have invented a new and useful Improvement in Veterinary Surgical Tables, of which the following is a specification.

This invention relates to a veterinary operating table to which a horse or any animal is secured and held in the proper and convenient position for surgical operations or for treatment; and the arrangement is such that the animal cannot strain or injure himself by kicking or attempting to raise up or move in any direction and at the same time he is held fast and secure, so as to enable the veterinary surgeon to operate upon or treat the animal with safety both to the surgeon and the animal.

Figure 1:
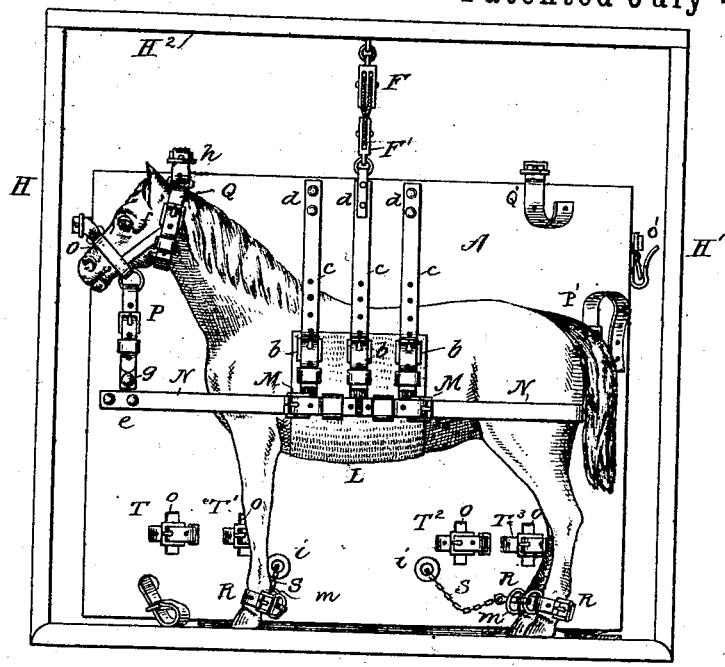
Figure 2:
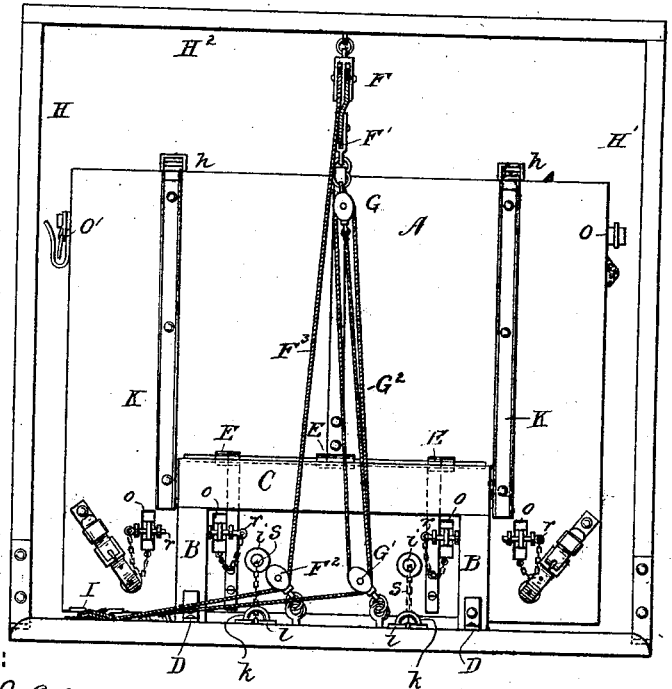
Figure 3:
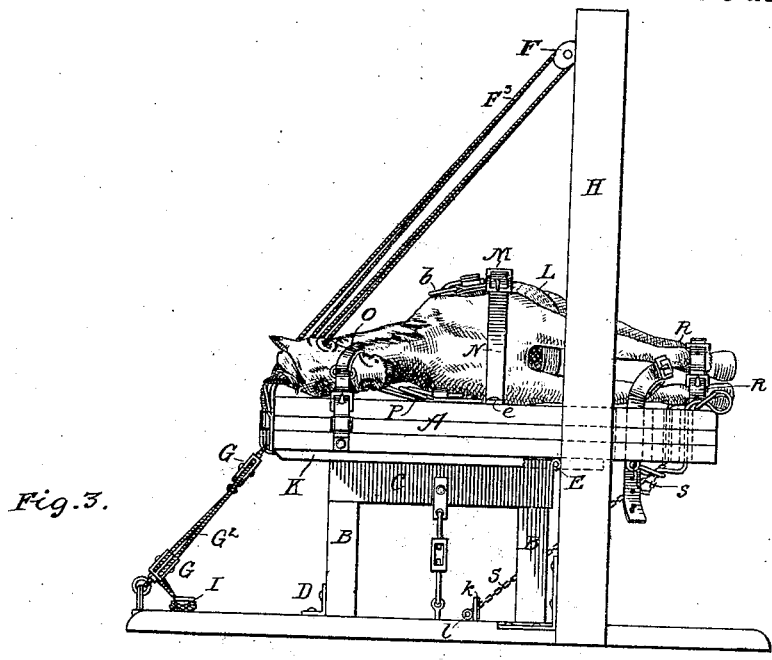
Figure 4:
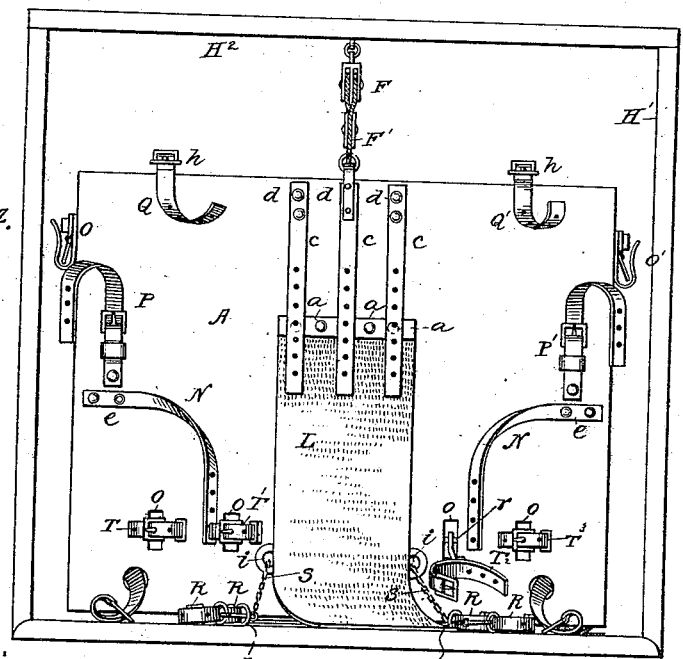

Reference being had to the annexed drawings, Figure 1 shows the front of the table with an animal led up to it and secured in position. Fig. 2 shows the back of the table and the mechanism for operating it. Fig. 3 shows the table turned down and the animal in position for an operation or for treatment. Fig. 4 shows the front of the table and the appliances for securing the animal in position.

The same letters refer to similar parts in all the figures.

A. is the table supported when in a horizontal position upon four legs, B. B. two at each end, and they are held in their relative places by a frame work at their upper ends indicated by C. and bolted to the floor or to a platform at D. D. The table is hinged at E. E. E. to one of the frame pieces so that it can be raised to a vertical position as in Fig. 1 or lowered or turned down to a horizontal position as in Fig. 3.

I have shown pulleys F. F'. F². for raising the table to a vertical position provided with a rope F³. and pulleys G. G'. and rope G². for turning the table down to a horizontal position but any other suitable means for thus raising or turning down the table can be employed. The pulley F. is attached to a frame work H. H'. H². and pulley F'. is attached to the edge of the table A. and pulley F². is attached to the floor or platform and the rope F³. is passed through these pulleys so that by pulling the rope F³. the table is hoisted or lifted to a vertical position. The pulley G. is also attached to the edge of the table and pulley G'. is attached to the floor or platform and rope G². is passed through them so that by pulling the rope G². the table is turned down to the horizontal position shown in Fig. 3, and by means of these two systems of pulleys and ropes the table can be steadily and carefully raised or lowered, without shocking or jarring the animal held in position on the table. The ropes are fastened to a cleat I. secured to the floor or platform.

K. indicates additional bolts or iron straps for holding the table firm and solid placed upon the back of the table.

Upon the front of the table I fasten securely and firmly an apron L. by means of the bolts at a. a. a. and the loose end of the apron is provided with buckles b. b. b. Three straps c. c. c. bolted to the table at d. d. d. pass into the buckles b. b. b., see Fig. 1, and hold up the apron L. which is passed under and around the body of the animal when he is led up to the table while it stands in a vertical position, see Fig. 1. At either side of the apron L. is a buckle M. M. and at either side of the table is a strap N. N. bolted fast at e. e.; these straps enter the buckles M. M. and hold the apron L. taut in a sidewise direction, so that the body of the animal by means of the apron and straps c. c. c. and N. N. is securely and firmly held in position. I prefer to put a halter upon the animal as shown by letter f. and to the top or nose strap is buckled the strap O. which is secured to the edge of the table. To the lower side of the halter f. is buckled in the strap P. also firmly secured to the table as shown at g. Around the neck of the animal I pass and buckle the strap Q. which is secured to the table at h. These straps O. P. and Q. hold the head in one position and keep it flat upon and secure to the table so that no wrenching or straining can happen to the animal. The feet are held in place by passing and buckling around the fetlocks, hobbles, one around each fetlock, indicated by the letters R. R. R. R.; to these hobbles are attached chains S. S., one chain for each pair of hobbles. These chains pass through holes i. i. in the table, see Fig. 1 and at their rear ends they pass through strong staples or eyes k. k. secured in the floor or platform, and each chain is provided with a cross bar *l. l.* so that it cannot pass through or beyond the staple *k.* These hobbles and chains are loose when adjusted to the animal but when the table is turned down to a horizontal position the chains are drawn up taut and held with a firm tension by the cross bar *l* striking against the staple *k.*, see Figs. 2 and 3, and thus the feet of the animal are held in position so that he cannot kick or injure himself. It will be observed that the chain S. is attached to the outer hobble and passes through a ring *m.* secured to the inner hobble and by this device one chain holds the pair of hobbles used on the front feet, and one chain controls and holds the pair of hobbles used on the hind feet of the animal.

Additional straps T. T'. T$^2$. T$^3$. are provided in case it is necessary to release the legs from the hobbles and move them in any desired position during the operation or treatment. These straps last referred to, pass through holes or slots *o, o. o. o.* made in the table and on the back of the table are provided pins *r. r. r. r*, to pass through holes made in these straps T. T'. T$^2$. T$^3$. and by means of this arrangement the animal's legs can be moved and held firmly in any position and it is very essential to have these straps as during nearly every operation or treatment they are employed. By means of the holes in the strap and these pins to fasten them in place, see Fig. 2, these straps can be easily and quickly adjusted and passing as they do through holes or slots in the table they are much more accurately adjusted than by bolting them fast to the table and using buckles to hold the strap secure, and much less irritation is caused to the animal by this device.

The animal can be placed in position either side to the table and for this purpose I have provided corresponding straps O'. P'. and Q'. see Figs. 1 and 4.

The greatest comfort and safety is provided for the animal by using this surgical operating table, and the danger of injuring the animal is reduced to the minimum, whereas the old method of throwing the animal on the floor and tying him fast afterward, very often resulted in straining or injuring him in the effort of securing him in position for an operation or treatment.

The operation of my operating table will be fully understood from the foregoing description. The animal is led up to the table while it is in a vertical position, the apron L. and all the straps are adjusted, and the hobbles put on as described. The table is then turned down to a horizontal position by means of the rope G$^2$. and pulleys G. and G'. and when the operation or treatment is finished the table is raised by the rope F$^3$. and pulleys F. F'. F$^2$. and the animal is then released.

Having described my invention, what I claim is—

1. The combination, with the table, of the apron secured at one end to the table and provided with buckles *b* at its other end and buckles M at its sides, the two straps N secured one at each end of the table and adapted to engage with the buckles M, and the straps *c* secured at one end to the edge of the table and adapted to engage with the buckles *b*, whereby the body of the animal is secured, substantially as set forth.

2. The combination, with the pivoted table, and means for tilting it from a vertical to a horizontal position; of hobbles adapted to hold the feet of an animal, the stationary eyes secured below the table, and the chains connected to the said hobbles, passing through holes in the table and through the said eyes and provided with crossbars, whereby the feet of the animal are automatically clamped against the table when the table is moved into its horizontal position, substantially as set forth.

3. The combination in an operating table for veterinary surgeons, of the table A provided with the apron L bolted to the table and provided with buckles at its bottom end, and straps at its top end, side buckles M M, straps to secure and hold taut the apron by means of the side buckles, the head straps O, P and Q bolted to the table, straps T, T', T$^2$, T$^3$, passing through slots made in the table and provided with pins at the back of the table, and hobbles R, R, R, R, provided with chains which hold the hobbles taut, when the table is in a horizontal position and release the hobbles when the table is in a vertical position, and suitable appliances for raising and lowering the table to and from a horizontal position.

In testimony that I claim the foregoing as my invention I have signed my name, in presence of two witnesses, this 23d day of January, 1893.

WILLIAM J. MAGEE.

Witnesses:
JAMES P. FOSTER,
JOHN M. FILSON.